Nov. 19, 1940.  W. R. ZWOYER  2,222,011
JOINT-SEALING DEVICE DEPENDENT ON AN APPLICATION OF HEAT AND PRESSURE
Filed Oct. 6, 1939   2 Sheets-Sheet 2
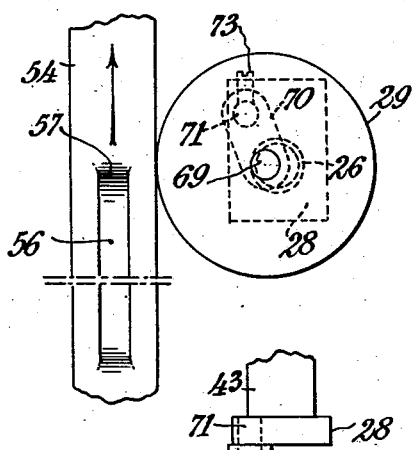
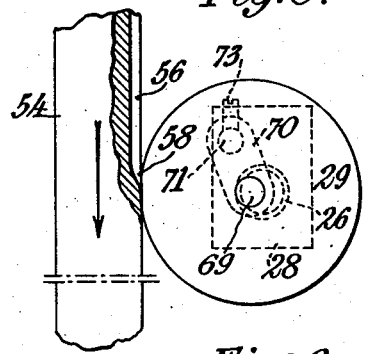
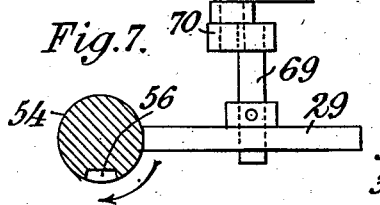
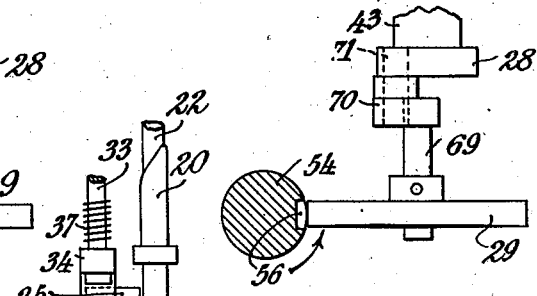
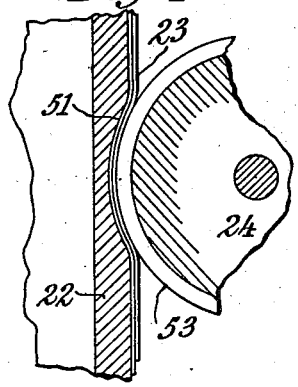
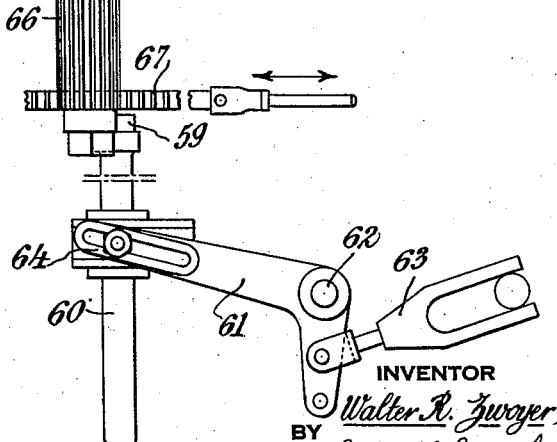
INVENTOR
Walter R. Zwoyer,
BY
Fraser, Myers & Manley
ATTORNEYS.

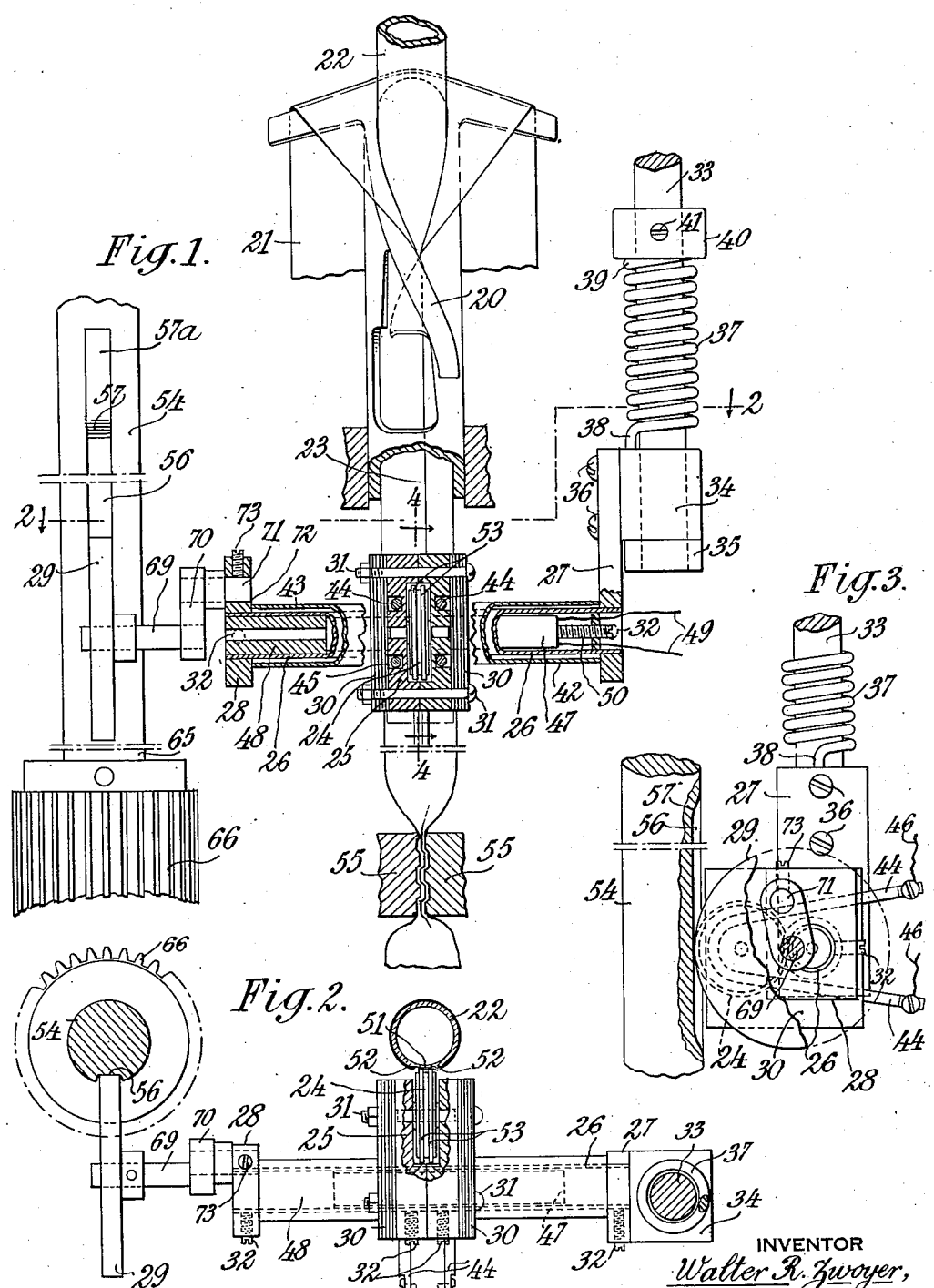

Patented Nov. 19, 1940

2,222,011

UNITED STATES PATENT OFFICE 2,222,011

JOINT-SEALING DEVICE DEPENDENT ON AN APPLICATION OF HEAT AND PRESSURE

Walter R. Zwoyer, Maywood, N. J., assignor to Transparent-Wrap Machine Corporation, New York, N. Y., a corporation of New York Application October 6, 1939, Serial No. 298,213

8 Claims. (Cl. 93—3)

This invention relates to improvements in joint-sealing means for uniting thermoplastic material by progressively applying heat and pressure in a predetermined path along superimposed layers thereof. It is a development of joint-sealing means disclosed in my prior United States Patent No. 1,986,422, of January 1, 1935, and might satisfactorily be used as a substitute for the means disclosed in that patent (see parts I, I', and parts 30 to 39, Fig. 2, and the description thereof, line 71, column 2, page 2, to line 40, column 1, page 3 of the specification) for effecting a longitudinal seal of the overlapped edges 29 of packaging material G continuously drawn from a reel over a former H (Fig. 2) by which it is caused to assume a tubular form.

The particular packaging material referred to in my aforesaid prior patent is a commercial article known as moisture-proof regenerated cellulose commonly sold under the name "Cellophane." It is an object of the present invention to provide satisfactory means for sealing superimposed layers of thermoplastic material, which cannot be subjected to the high degree of temperature which has heretofore been used in sealing the joints of packages made of "Cellophane." One such material calling for limitations as to the degree of temperature to which it may be subjected without detrimental consequences, and for which it is an object of this invention to provide practicable sealing means, is an article of commerce generally known as rubber latex or rubber hydrochloride sheet which is obtainable on the market under the trade-mark "Pliofilm," by which name it will hereinafter be designated throughout this specification.

The sealing means of my prior patent to which reference has been made (see Fig. 2) comprised an electrically heated roller I or I' having a corrugated peripheral portion between which and a correspondingly corrugated portion of a tubular element 24 of the former for the packaging material the overlapped edges of said material might be drawn and caused to adhere by means dependent upon heat and pressure as applied by the roller. It will be noted that the corrugated portion 31 of the former tube was rectilinear so that the period during which the layers of material to be united were compressed between the surface of the heating roller and the backing plate consisting of the face of the former tube, as the material was rapidly drawn along said tube, was almost instantaneous. This time element could not have been prolonged by merely increasing the depth of the corrugations without subjecting the contacting portions of the heating roller and the material to be sealed to objectionable rubbing contact. It is an object of the present invention to provide satisfactory means whereby the temperature required to effect the seal of a joint during the movement of the material to be united between the heating roller and the backing plate may be materially decreased by correspondingly increasing the period during which such material would be confined between the surface of the roller and the surface of the backing plate.

In the accompanying drawings illustrating the preferred form of the invention—

Figure 1 is a front view of joint-sealing means embodying the invention, parts being illustrated in cross section and parts broken away to disclose underlying structure. Note: The lower, central fragment of this figure, illustrating the sealing dies, is a side view.

Fig. 2 is a cross-sectional view of the sealing means illustrated by Fig. 1 cut along planes at levels indicated by the line 2—2 and viewed in the direction indicated by the arrows.

Fig. 3 is an end view of parts of the mechanism illustrated by Fig. 1, as viewed from the left.

Fig. 4 is a large-scale, vertical, sectional view through parts illustrated by Fig. 1, as cut along a plane indicated by the line 4—4 and viewed in the direction shown by the arrows.

Fig. 5 is a vertical, elevational view of fragmentary portions of a mechanism embodying the invention including parts of the device illustrated by Fig. 1, as viewed from the right, reciprocating means located at a lower level as viewed from the same direction, and rotating means located at an intermediate level as viewed from the front.

Fig. 6 is an end view of a portion of the mechanism illustrated by Fig. 3, parts of which are represented in different positions.

Fig. 7 is a top view of parts of the device illustrated by Fig. 6.

Fig. 8 is an end view corresponding with that illustrated by Fig. 6 after parts have been moved to positions differing from those in which they are represented in Figs. 3 and 6.

Fig. 9 is a top view of the parts of the device illustrated by Fig. 8.

Sealing means embodying the invention in the form herein illustrated comprises a tube-forming device 20 of the general character of the one designated H in Figs. 2, 10 and 11 of my aforesaid prior patent, over which packaging material 21 may be drawn and bent about the tubular element 22 of the former to a form having longitudinally extending, overlapped, marginal portions 23, which it is the object of the invention to unite by the application of heat and pressure. The sealing means relied upon for such purpose includes a roller 24, journaled in a relatively massive metal enclosure 25, mounted intermediate the ends of a rigid tubular structure 26, secured at one end in a support 27 and at its other end in a mounting plate 28 for a roller 29, forming part of means for varying the position of the heating roller 24 with respect to the underlying tubular element 22 of the forming device which may serve as a backing plate.

The elements of the metal enclosure 25 for the heating roller 24 may be secured together between slabs 30 of heat insulating material in any appropriate manner, as by fastening devices 31, and the housing 25, support 27 and roller mounting 28 may be firmly secured to the tube 26 in any suitable manner, as by set screws 32 (see Fig. 2).

As in the case of the corresponding joint-sealing mechanism disclosed in my prior patent, the mounting means for the heating roller 24 and its enclosure 25 may be journaled upon a vertical supporting shaft 33 (Fig. 1) by means of a rotatable sleeve 34 maintained at a desired level by a support 35, threaded or otherwise secured to the lower end of the shaft 33.

The support 27 may be secured to the sleeve 34 by screws 36 or other appropriate fastening means, and a helical spring 37 surrounding the shaft 33, having one end 38 connected with the sleeve 34 and the other end 39 connected with a second sleeve 40 secured to the shaft 33 by a set screw 41 or its equivalent, may be provided as a means for moving the structure, in which the heating roller is mounted, to and maintaining it in a position such that the periphery of the roller will be yieldingly held in contact with a surface portion of the underlying backing plate.

The housing 25, 30 for the heating roller 24 may be held in a definite, spaced relation between the support 27 and roller mounting element 28 by tubular spacing elements 42, 43 of larger internal diameter than the external diameter of the tube 26, thus affording an intervening, annular, air-filled space adapted to serve as heat insulation for parts of the mechanism hereinafter to be described.

Appropriate means for heating the metal enclosure 25, within which the roller 24 is mounted, may comprise electric heating units 44 (see Figs. 1 and 3), which may be enclosed within channels 45 in the metal housing by the slabs 30 of heat insulating material.

The electric heaters 44 may comprise heating elements of suitable wire of relatively small diameter embedded within fillings of powdered insulating material packed in and protected by tubular metal containers which serve as shields or protectors. Such electric heating devices are well-known articles of commerce, the specific details of which constitute no part of the invention herein disclosed and claimed. The heaters may be connected with a suitable source of electric energy by means of flexible conducting wires 46 (see Fig. 3). When two or more are used, they may be connected either in series or in parallel, dependent upon the voltage of the source of electromotive force with which they are connected and the difference of potential at which they are designed to function.

Attention is directed to the fact that the intimate relation between the roller 24, its metal enclosure 25 and the insulated electric heaters 44, due to which heat may be conducted by radiation from the insulated electric heating elements to the enclosure and by conduction and radiation from the enclosure to the roller, is such as to dispense with any reliance upon commutators, slip rings or other electrical connections involving movable elements.

The temperature of the metal housing for the roller 24 may be maintained at a predetermined degree by means of a thermostatically controlled circuit-breaker 47, supported by the tube 26, as illustrated in Fig. 1, within which it may be inserted and moved to a position determined by a cylindrical base-block 48 fixedly secured within the left end of the said tube and having an axial opening therein through which an implement may be thrust to remove the circuit-breaker. The circuit-breaker 47 is also an article of commerce, the details of which involve no part of the invention herein disclosed and claimed. It includes spaced contacts (not shown) in the circuit by which the heaters 44 are energized and which may be opened and closed when the temperature of the sensitive elements of the thermostat are caused to exceed or fall below the desired predetermined temperature. Flexible terminal connections by which the circuit-breaker may be included in circuit with the electric heaters 44 are designated 49 on Fig. 1 of the drawings.

The circuit-breaker 47 may also be provided with adjusting means 50, not shown in detail, by which the predetermined temperature of the thermostat, which, when exceeded, will cause the circuit to be opened, and at which, if of a lower degree, the circuit will be closed, may be varied to such extent as may be needed to adapt it to different conditions of service.

It is, of course, important that the thermostatic controlling element of the circuit-breaker 47 be so located with respect to the metal housing 25, relied upon as a heater for the roller 24, that variations in temperature of the heater may be rapidly communicated to the said thermostatic controlling element so that the opening and closing of the circuit-breaker will be promptly responsive to critical changes in temperature of the roller.

As best illustrated in Fig. 4, an important feature of the invention comprises an arcuate depression 51 in the portion of the element 22 of the tube-forming device which serves as a backing plate for the heating roller 24. This depression 51 should be so positioned as to underlie the adjacent peripheral surface of the roller. It should have the axis of its curved surface disposed crosswise with respect to the direction of relative movement between the backing plate and the overlying layers of material to be united, and its side walls 52 (see Fig. 2), which may be parallel to each other and to the direction of such relative movement, should be so spaced as to afford ample working clearance when material is pressed into the depression by the roller.

The depression should be so formed and located with respect to the roller and its mounting means that the roller may be moved to a position such that its axis will be coincident with the axis of the curved surface of the depression, at which time the material to be united will be yieldingly held by the spring 37 of the roller mounting means between the periphery of the roller and the curved surface of the depression. In order that the material may be subjected to a uniform degree of compression throughout the entire period during which it is being moved between the effective surface portion of the roller and the effective surface portion of the depression, the radius of the roller should be such that its perimeter will be concentric with the curved surface of the depression when separated therefrom only to the extent of the thickness of the intervening layers of material to be united.

Preferably the roller 24 will be provided with a plurality, that is two as herein disclosed, of spaced, annular, peripheral ridges 53 (Figs. 1 and 2) whereby it may be adapted to apply heat to restricted areas at increased pressure as compared with what would be the effectiveness of a roller of like size and material having a cylindrical surface of uniform radius throughout its width.

When, as in the case of the longitudinal-joint-sealing means disclosed in my prior patent, the material to be united by the heating roller is intermittently moved along the tubular element of the forming device, it is important, in order to avoid damaging the material by overheating, that means be provided to separate the heating roller from the surface of the material during each period of rest. To this end, the form of sealing means herein disclosed includes an element 54 to which may be imparted, by means hereinafter to be referred to, successive longitudinal movements in opposition directions in alternation with angular movements in opposite directions. This element 54, as will be explained, so cooperates with the roller 29 as to permit the heating roller 24 to be held in contact with the material to be united during relative movement between the material and the underlying backing plate and to lift the roller to a position free of contact with the material during periods of rest.

The invention as herein disclosed may, in conformity with that disclosed in my prior patent, include a pair of heated dies 55 (Fig. 1) provided with means whereby they may be caused to clamp the packaging material after it has been drawn over the former 20 and after overlapping marginal portions thereof have been sealed by the heating roller 24 and effect transverse seals of the material between portions intended to be used as containers for merchandise. As explained in detail in the prior patent, these dies 55, after being brought into contact with the material, may be moved downwardly so as to draw a new length of material through the former and under the roller 24 while effecting a seal. They may then be caused to release the packaging material and move upwardly or in the reverse direction to a level at which it is desired to effect another transverse seal. During this period following the closing of the dies 55 to effect a transverse seal of the packaging material and their subsequent closing to effect another transverse seal after the strip has been advanced, the intervening, partly completed container, which has been bent to a tubular formation by the former, and overlapping, lengthwise extending, marginal elements of which have been united, may be filled with the merchandise to be packaged by dropping it through the tubular element 22 of the former.

Note that the lower, central fragmentary portion of Fig. 1, which illustrates the tube-gripping and transverse sealing dies 55, is a side view, whereas the remainder of Fig. 1 is a front view.

The bar 54, which cooperates with the roller 29 as a means whereby the heating roller 24 may be caused to press the material to be united against the curved surface at the base of the depression in the backing plate during relative movement between the material and the backing plate, and to be moved away from the material during periods of rest, is provided with a groove 56 so positioned as to permit the roller to enter the groove during downward movement of the bar which is coincident with downward movement of the material gripping dies 55 and allow the roller 24 to enter the depression in the backing plate. The end 57 of the groove 56 is so disposed that, at the completion of the downward movement of the gripping dies 55 and bar 54, the said end 57 of the groove will be moved slightly below the contacting portion of the periphery of the roller so that the roller will make contact with the cylindrical surface of the bar. When so positioned, the heating roller 24 will have been moved to a position free from contact with the underlying material by a slight rotation of the roller mounting means against the opposing effort of the spring 37. Following the downward movement of the gripping dies 55 and bar 54, the grippers will be released from the packaging material by means specifically disclosed in my prior patent, and at the same time the bar 54 will be rotated in a clockwise direction, as indicated by the arrow in Fig. 7, to the position relative to the roller 29 in which those parts are represented in Figs. 6 and 7. Subsequently, the gripping elements 55 and the bar 54 will be moved upwardly, as indicated by the arrow in Fig. 6, until the bar attains the level illustrated in Fig. 8, in which the lower end 58 of the groove 56 is slightly above the level of the center of the roller 29. The bar 54 will then be rotated in a counterclockwise direction, as indicated by the arrow in Fig. 9, to bring the roller and the bar to the relative positions in which they are indicated in Figs. 8 and 9. During this rotation of the bar the gripping dies 55 will again be closed to effect a transverse seal of the packaging material so as to form the upper closure of a container filled with merchandise and lower closure of a partly formed container to be subsequently filled.

The foregoing cycle of operations may be repeated continuously. After the gripping dies 55 have been closed to the positions in which they are shown in Fig. 1, with the roller 29 and bar 54 in the positions in which they are indicated in Figs. 8 and 9, the gripping dies and bar will be moved downwardly, as shown by the arrow in Fig. 8, so as to allow the roller to enter the groove 56 and thereby permit the heating roller 24 to enter the arcuate depression 51 in the backing plate 22 and press the underlying material to be united against the base of the depression throughout substantially all of the downward movement of the bar.

In Fig. 5 are illustrated fragmentary portions of the means relied upon to effect the above-described movements of the gripping dies 55 and roller operating bars 54, which may conform with corresponding parts of the mechanism disclosed in my prior patent. In this case, as in the previously disclosed mechanism, the package forming and sealing means may be duplicated in a single machine.

As herein disclosed, the means whereby the gripping dies and shaft 54 are reciprocated comprises a mounting bar 59, supported by a shaft 60, which may be intermittently raised and lowered by a bell-crank 61, mounted for rocking movement with respect to a fixed support 62. The bell-crank may be connected with the shaft 60 by a slip-joint connection 64, and the rocking movement may be imparted to the bell-crank by a pitman 63, driven by a slotted cam and associated mechanism, not herein disclosed but specifically illustrated and described in my prior patent (see parts 90 to 100, inclusive, at the bottom of Figs. 1 and 3 of the drawings, and the description thereof beginning in line 53, column 1, page 4, and ending with line 69, same column, same page).

The intermediate part of Fig. 5 hereof illustrates means whereby angular movement in opposite directions may be imparted to a shaft 65 mounted for rotary movement in the member 59. This shaft may comprise a part of the means for effecting the opening and closing of the gripping dies 55, and an upper extension of this shaft 65 may serve as the bar 54 relied upon to control the movements of the roller 29 by which the mounting means for the heating roller 24 is rocked about the mounting shaft 33 in order to alternately cause the heating roller to be pressed against the material to be united and to be removed therefrom. If the mechanism is used as a part of a duplex machine such as is disclosed in my prior patent, two such shafts 65 will be mounted in the member 59.

The means for imparting angular movements to the shaft 65 without interfering with its reciprocating movements may comprise an elongated pinion 66, an engaging rack 67 and driving means for said rack such as is illustrated at the lower right-hand corner of Fig. 1 of my prior patent and described in the part of the specification thereof commencing with line 44, column 2, page 3, and ending with line 74, same column, same page.

It will be observed that the length of the pinion 66 (Fig. 5 hereof) is such that the shaft 65 may be moved downwardly from the position there shown by the bell-crank 61, for the purpose of lowering the associated roller operating bar 54 and the gripping dies 55, without being moved out of mesh with the rack 67, relied upon to impart angular movements in opposite directions during intervals between the raising and lowering of the shaft 65.

In order to more clearly indicate the functional relations of the bell-crank driving mechanism, illustrated at the bottom of Fig. 5, and the rack-and-pinion mechanism illustrated at the intermediate portion of that figure, the intermediate fragment is represented as it would appear if viewed at an angle of ninety degrees with respect to the angle at which the upper and lower parts of Fig. 5 are viewed.

Mounted upon the shaft 65, or so mounted as to extend from one to the other of two such shafts if the mechanism is applied to a duplex machine, is a casing or housing 68 for mechanism controlled by angular movements of the shaft 65 and by which the gripping dies 55 may be closed and caused to grip packaging material at the end of each upward movement of the shaft 65 and where they may be separated to free the packaging material at the end of each downward movement of said shaft. This mechanism is illustrated in Figs. 1 to 4, 8 and 9 of my prior patent, and described in the part of the specification commencing with line 58, column 1, page 3, and ending with line 43, column 2, same page.

In order that the roller 29 may be accurately so positioned that, when riding in the groove 56 of the bar 54, the heating roller 24 will be permitted to press the material to be united against the curved surface of the depression in the backing plate with an intensity which may to a certain extent be dependent upon the adjustment of the said roller 29, the latter may be journaled upon a spindle 69, forming part of a bracket 70 having a cylindrical attaching element 71, mounted in a cylindrical opening 72 in the roller mounting block 28 and held in fixed relation with respect to said block by a set screw 73 or other suitable fastening means. By loosening the set screw 73, the roller 29 may be adjusted to any desired position by imparting the necessary degree of angular movement to the bracket 70, after which the bracket may be fixedly secured in the adjusted position by again tightening the set screw 73.

Although the above-described invention may be applied to sealing means adapted to unite layers of "Pliofilm" by application of heat and pressure, it is not necessarily limited to means for sealing that particular material. The invention may be more generally applied to sealing means for uniting layers of thermoplastic material other than "Pliofilm" which would be damaged by application of the heating roller at a temperature such as to effect a seal as a result of substantially instantaneous contact, in conformity with the operation of the longitudinal sealing means disclosed in my prior patent, but which might be satisfactorily united at a lower temperature, dependent upon the particular material to be sealed, if applied for a materially longer period the duration of which would be dependent upon the maximum temperature which it is practicable to use without damaging results. The degree of temperature and the period of application, when treating materials of different physical properties, would doubtless vary.

When designing a sealing means intended to unite "Pliofilm" or any similar thermoplastic material, it is not at all essential that the temperature of the heating roller be uniform for all operations of the mechanism. What is of importance is that the duration of contact of the heating roller with the material to be operated upon be sufficiently great, when the latter is being moved at its maximum speed, to effect a seal at a temperature such as will not be harmful. After such time element has been determined, the maximum speed at which the material may be moved can readily be ascertained. The length of the curved surface of the arcuate depression 51, between which and the opposed perimeter of the heating roller 24 the material is drawn, must be such, when the material is moved at its maximum rate, that the time within which the material to be united will be caused to be moved from the entranceway to the arcuate depression to the point of departure may be of sufficient duration that the desired seal may be effected without exceeding the maximum temperature which can safely be used. After having once established these relations, if it is desired to move the material at a relatively lower rate of speed such as would be occasioned when making and filling shorter merchandise containers, without varying the rate of the cycle of operations of the machine as a whole, the temperature of the heating roller might be lowered to an extent such as to compensate for the increase in time required to draw the packaging material along the surface of the depression opposed by the roller by a suitable adjustment of the thermostatically controlled circuit-breaker 47.

The length of the path of movement of material to be sealed between the curved surface of the depression in the backing plate and the opposed periphery of the roller may be varied within certain limits dependent upon the desired time element of the movement of the material along that path, in order to conform with the desired speed at which the packaging material is to be drawn through the former 20 by the gripping dies 55 at maximum operation, by suitably apportioning the radii of the curved surface of the depression and of the heating roller, or by suitably apportioning the depth and angular extent of the arcuate depression, or by suitably apportioning both of these sets of elements.

As will be obvious, it is not essential that the arcuate depression 51, of the backing plate 22 (Figs. 2 and 4), shall have side walls, as distinguished from a construction of which its curved surface might extend transversely without limit to an extent such as to merge into the cylindrical surface of the tube-former which serves as the backing plate.

It may be observed that in the operation of the above-described mechanism there is a short interval of time, at the beginning and end of each downward movement of the packaging material, during which the longitudinal sealing means is ineffective. This results in a series of uniformly spaced, relatively short gaps in the longitudinal joint which are not sealed. These ineffective intervals occur during the short period required to permit the roller 29 to enter the groove 56 in the bar 54 from the position in which it is shown in Fig. 8, and to cause it to ride out of the groove at the opposite end of the movement of the bar before the bar is turned to the angular position in which it is shown in Fig. 6. These spaced, unsealed gaps are beneficial rather than detrimental. By properly locating the level of the reciprocatory operating means 68 (Fig. 5) for the gripping and transverse sealing dies 55 (Fig. 1) with respect to the tube-former 20 and longitudinal sealing means, 24, 51, and associated parts (Figs. 1 and 4), the transverse sealing means may be caused to be effective at such times that the transverse seals will be spaced in accordance with the spacing of the gaps in the longitudinal seals, whereby the gaps will be closed by the transverse sealing dies. In this manner the longitudinal and transverse seals may be effected without subjecting any appreciable area of the material to be united to a double heating.

In order that the length of the groove 56 in the bar 54 may be adjusted to conform with adjustments as to the extent of reciprocal movements of the gripping dies 55, when resorted to for the purpose of adapting the machine to make packages of different lengths, the positions of either or both of the effective ends of said groove may be made variable. One manner of accomplishing this result is suggested in Fig. 1 in which the effective upper end 57 of the groove is represented as comprising a part of a removable block 57a fixedly held in an extension of the groove. By substituting blocks 57a of different lengths the effective length of the groove may be varied.

The foregoing invention is not intended to be limited to the specific mechanism herein illustrated and described, but may include modifications and variations thereof within the scope of the appended claims.

What is claimed is:

1. Joint-sealing means for uniting layers of thermoplastic material by progressively applying heat and pressure in a predetermined path along superimposed layers thereof, said means comprising:—a pressure resistant backing plate; means for effecting progressive relative movement between the said plate and overlying layers of material to be united; an arcuate depression in the surface of the plate over which the material may be moved, said depression having the axis of its curved surface disposed perpendicularly with respect to the direction of the said relative movement; a roller; mounting means whereby said roller may be moved from a position free from the surface of material overlying the depression in said plate to a position such that its axis will be coincident with that of the curved surface of the depression and such that a portion of the periphery of the roller will be caused to make contact with and deflect any intervening material into the depression, the radius of the roller being such that its perimeter will be concentric with the curved surface of the depression when separated therefrom only to the extent of the thickness of the intervening layers of material to be united; controlled means for maintaining the roller at a predetermined temperature; and resilient means for maintaining the roller in yielding engagement with material intervening between its perimeter and the opposed curved surface of the depression, the radii of the roller and of the depression and the arcuate extent of the depression being such that when the sealing means is being operated at maximum velocity each element of the material to be sealed shall be confined between a part of the perimeter of the heating roller and an opposed surface portion of the depression for a period of such duration that the material may be caused to adhere without making it necessary to maintain the roller at a degree of temperature such as would injure it.

2. Joint-sealing means, such as is defined by claim 1, of which the arcuate depression has parallel side walls perpendicular to the axis of its curved surface, and of which the thickness of the peripheral portion of the roller is less than the width of the depression to an extent such as to provide working clearance for material to be united when deflected between the roller and the said walls.

3. Joint-sealing means, such as is defined by claim 1, of which the heating roller has a plurality of spaced, annular, peripheral ridges, whereby it is adapted to apply heat to restricted areas at increased pressure as compared with the effectiveness of a roller of like size and material having a cylindrical surface of uniform radius throughout its width.

4. Joint-sealing means, such as is defined by claim 1, having a relatively massive metal enclosure for a material part of the roller from which heat energy may be communicated directly to the latter by conduction and radiation, and externally insulated, electrically energized heating means, in close association with said metal enclosure, from which heat may be transmitted by radiation through the insulation of said heating means to the metal of the enclosure.

5. Joint-sealing means, such as is defined by claim 1, of which the means for producing relative movement between the backing plate and overlying layers of material to be united is intermittently effective, in combination with means associated with the movable roller mounting means by which said mounting means may be permitted, during periods of such relative movement, to cause the roller to be moved into contact with the material to be united and to yieldingly press it against the curved surface of the arcuate depression, and by which the mounting means may be caused to move the roller out of contact with the said material and maintain it in such non-contacting position during the intervening periods of rest.

6. Joint-sealing means, such as is defined by claim 1, of which the temperature controlling means for the roller comprises an electric heater and an electric circuit whereby the heater may be connected with a source of electric energy, the said circuit including current controlling means dominated by a thermostat so located in the roller mounting means as to be subject to changes of temperature of the roller and associated parts so positioned as to be influenced by changes of temperature of the electric heater.

7. Joint-sealing means, such as is defined by claim 1, of which the temperature controlling means for the roller comprises an electric heater and an electric circuit whereby the heater may be connected with a source of electric energy, the said circuit including current controlling means dominated by a thermostat so located in the roller mounting means as to be subject to changes of temperature of the roller and associated parts so positioned as to be influenced by changes of temperature of the electric heater, and the said thermostatically dominated current controlling means including adjusting means whereby it may be caused to be effective at different temperatures to adapt the sealing means for operation at different speeds.

8. Joint-sealing means for uniting superimposed layers of thermoplastic material by the application of heat and pressure, comprising longitudinal sealing means for progressively uniting succesive portions of a structure to be sealed separated by spaced unsealed gaps; transverse sealing means for uniting portions of said structure disposed crosswise with respect to the parts united by the longitudinal sealing means; and means for successively causing portions of the material to be sealed to be fed to and through the said sealing means, the two sealing means being so disposed with respect to each other that the gaps separating the longitudinal seals will be closed by the transverse sealing means.

WALTER R. ZWOYER.